US010194362B2

(12) United States Patent
Hoehne et al.

(10) Patent No.: US 10,194,362 B2
(45) Date of Patent: Jan. 29, 2019

(54) SERVICE BASED CELL RE-SELECTION

(71) Applicant: NOKIA SOLUTIONS AND NETWORKS OY, Espoo (FI)

(72) Inventors: Hans Thomas Hoehne, Helsinki (FI); Amaanat Ali, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/544,055

(22) PCT Filed: Jan. 21, 2015

(86) PCT No.: PCT/EP2015/051079
§ 371 (c)(1),
(2) Date: Jul. 17, 2017

(87) PCT Pub. No.: WO2016/116145
PCT Pub. Date: Jul. 28, 2016

(65) Prior Publication Data
US 2018/0014232 A1 Jan. 11, 2018

(51) Int. Cl.
*H04W 36/04* (2009.01)
*H04W 84/04* (2009.01)
(Continued)

(52) U.S. Cl.
CPC ............ *H04W 36/04* (2013.01); *H04W 4/06* (2013.01); *H04W 48/12* (2013.01); *H04W 48/18* (2013.01);
(Continued)

(58) Field of Classification Search
CPC ... H04W 36/04; H04W 36/30; H04W 84/045; H04W 48/18; H04W 4/06; H04W 8/00; H04W 8/08; H04W 8/085; H04W 16/00; H04W 16/24; H04W 16/32; H04W 84/10; H04W 92/00; H04W 92/04; H04W 92/16; H04W 36/16; H04W 36/18; H04W 36/08; H04W 72/04; H04W 72/0453;
(Continued)

(56) References Cited

U.S. PATENT DOCUMENTS 7,437,178 B2 * 10/2008 Jeong ................ H04W 36/0055
  455/525
8,750,181 B2 * 6/2014 Purnadi ............... H04L 65/4076
  370/310

(Continued)

OTHER PUBLICATIONS

International Search Report & Written Opinion dated Oct. 8, 2015 corresponding to International Patent Application No. PCT/EP2015/051079.

(Continued)

*Primary Examiner* — Meless N Zewdu
(74) *Attorney, Agent, or Firm* — Squire Patton Boggs (US) LLP

(57) ABSTRACT

A first network node of a first frequency layer, acquires (201) information on services that are offered by a second network node at a second, different frequency layer. The second network node is within the coverage area of the first network node. The first network node broadcasts (202) a service advertisement message to at least one terminal device (UE) for advertising the services offered by the second network node at the second frequency layer.

20 Claims, 10 Drawing Sheets

(51) Int. Cl.

| | | |
|---|---|---|
| H04W 48/12 | (2009.01) | |
| H04W 48/18 | (2009.01) | |
| H04W 4/06 | (2009.01) | |
| H04W 36/00 | (2009.01) | |
| H04W 72/04 | (2009.01) | |
| H04W 4/50 | (2018.01) | |
| H04W 88/18 | (2009.01) | |
| H04W 4/029 | (2018.01) | |
| H04W 4/18 | (2009.01) | |
| H04W 4/23 | (2018.01) | |
| H04W 28/16 | (2009.01) | |
| H04W 84/10 | (2009.01) | |
| H04W 4/70 | (2018.01) | |
| H04W 72/00 | (2009.01) | |
| H04W 76/40 | (2018.01) | |
| H04W 4/60 | (2018.01) | |
| H04W 28/18 | (2009.01) | |

(52) U.S. Cl.
CPC .......... H04W 84/04 (2013.01); H04W 4/029 (2018.02); H04W 4/18 (2013.01); H04W 4/23 (2018.02); H04W 4/50 (2018.02); H04W 4/60 (2018.02); H04W 4/70 (2018.02); H04W 28/16 (2013.01); H04W 28/18 (2013.01); H04W 36/0007 (2018.08); H04W 36/00835 (2018.08); H04W 72/005 (2013.01); H04W 72/04 (2013.01); H04W 72/0406 (2013.01); H04W 76/40 (2018.02); H04W 84/045 (2013.01); H04W 84/10 (2013.01); H04W 88/18 (2013.01)

(58) Field of Classification Search
CPC . H04W 36/0061; H04W 48/00; H04W 48/10; H04W 48/018; H04W 88/06; H04W 88/08; H04W 88/18; H04W 52/244; H04W 16/12; H04W 16/14; H04W 40/06; H04W 40/20; H04W 88/00; H04W 40/04; H04W 40/00; H04W 40/08; H04W 40/12; H04W 16/18; H04W 88/02; H04B 7/2606; H04B 7/04; H04B 1/0064; H04B 1/005; H04B 1/18; H04B 7/02; H04B 7/0404; H04B 7/0408; H04Q 1/00; H01Q 3/00
USPC .......................................................... 455/443
See application file for complete search history.

(56) References Cited

U.S. PATENT DOCUMENTS

| | | | | |
|---|---|---|---|---|
| 9,179,466 | B2* | 11/2015 | Abe ................. | H04W 72/082 |
| 9,386,557 | B2* | 7/2016 | Tenny .............. | H04L 12/1881 |
| 9,680,582 | B2* | 6/2017 | Lee .................. | H04H 20/72 |
| 2009/0137249 | A1 | 5/2009 | Horn et al. | |
| 2010/0227611 | A1* | 9/2010 | Schmidt ............ | H04W 4/06 |
| | | | | 455/434 |
| 2011/0222401 | A1* | 9/2011 | Kyeong-In ........ | H04H 20/57 |
| | | | | 370/230 |
| 2013/0039250 | A1* | 2/2013 | Hsu .................. | H04H 20/71 |
| | | | | 370/312 |
| 2013/0301509 | A1 | 11/2013 | Purnadi et al. | |
| 2014/0087716 | A1 | 3/2014 | Vaderna et al. | |
| 2014/0223479 | A1* | 8/2014 | Krishnamoorthi .. | H04L 12/189 |
| | | | | 725/39 |
| 2015/0063193 | A1* | 3/2015 | Veerepalli ........ | H04W 48/16 |
| | | | | 370/312 |
| 2016/0007321 | A1* | 1/2016 | Zhang .............. | H04W 48/12 |
| | | | | 370/312 |
| 2017/0310718 | A1* | 10/2017 | Kim ................. | H04L 65/4076 |
| 2018/0027528 | A1* | 1/2018 | Hong ............... | H04W 4/08 |
| | | | | 370/331 |

OTHER PUBLICATIONS

Alcatel-Lucent et al: "Neighbouring cell MBMS service information for service continuity," 3GPP Draft; R2-114280, 3GPP TSG-RAN WG2 Meeting #75, Aug. 22-26, 2011, Athens, Greece, Aug. 15, 2011, XP050539734.

Qualcomm Incorporated, "Service Continuity for MBMS UEs in RRC_IDLE mode," 3GPP Draft; R2-113915, 3GPP TSG-RAN2 Meeting #75, Athens, Greece, Aug. 22-26, 2011, Aug. 16, 2011, XP050539883.

LG Electronics Inc., "MBMS Service Continuity for Inter-Rat Mobility," 3GPP Draft; R2-120709, 3GPP TSG-RAN WG2 #77, Dresden, Germany, Feb. 6-10, 2012, XP050565525, Jan. 31, 2012.

Alcatel-Lucent et al.: "Cell reselection prioritization for MBMS service continuity," 3GPP Draft; R2-114279, 3GPP TSG-RAN WG2 Meeting #75, Athens, Greece, Aug. 22-26, 2011, XP050539733, Aug. 15, 2011.

NTT Docomo, Inc., "Introduction of Dual Connectivity," 3GPP, R2-144660, Change Request, 3GPP TSG-RAN WG2 Meeting #88, San Francisco, USA, Nov. 17-21, 2014.

3GPP TR 36.872 V12.1.0 (Dec. 2013), Technical Report, 3rd Generation Partnership Project; Technical Specification Group Radio Access Network; Small cell enhancements for E-UTRA and E-UTRAN—Physical layer aspects (Release 12), Dec. 2013.

3GPP TS 23.041 V12.6.0 (Jun. 2014), Technical Specification, 3rd Generation Partnership Project; Technical Specification Group Core Network and Terminals; Technical realization of Cell Broadcast Service (CBS) (Release 12), Jun. 2014.

3GPP TS 36.300 V12.3.0 (Sep. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Sep. 2014.

3GPP TS 36.304 V12.2.0 (Sep. 2014), Technical Specification, 3rd Generation Partnership Project; Technical Specification Group Radio Access Network; Evolved Universal Terrestrial Radio Access (E-UTRA); User Equipment (UE) procedures in idle mode (Release 12), Sep. 2014.

3GPP TS 36.331 V12.3.0 (Sep. 2014), Technical Specification, 3rd Generation Partnership Project; Technical Specification Group Radio Access Network; Evolved Universal Terrestrial Radio Access (E-UTRA); Radio Resource control (RRC); Protocol specification (Release 12), Sep. 2014.

* cited by examiner

SERVICE BASED CELL RE-SELECTION

TECHNICAL FIELD

The invention relates to communications.

BACKGROUND

In a 5G cellular system, cells may be macro cells or small cells, depending on the radio access technology (RAT) used or the frequency band chosen within a cmW or mmW band. Most 5G cells are small cells having a limited coverage. The small cells are used for complementing the macro cells. Further, given their limited coverage, it is expected that a large amount of 5G small cells may be present within one macro cell. A lot of redirection traffic is handled by macro cell network nodes. This is due to user terminals (UE) wishing to access a service not offered by the macro cell.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
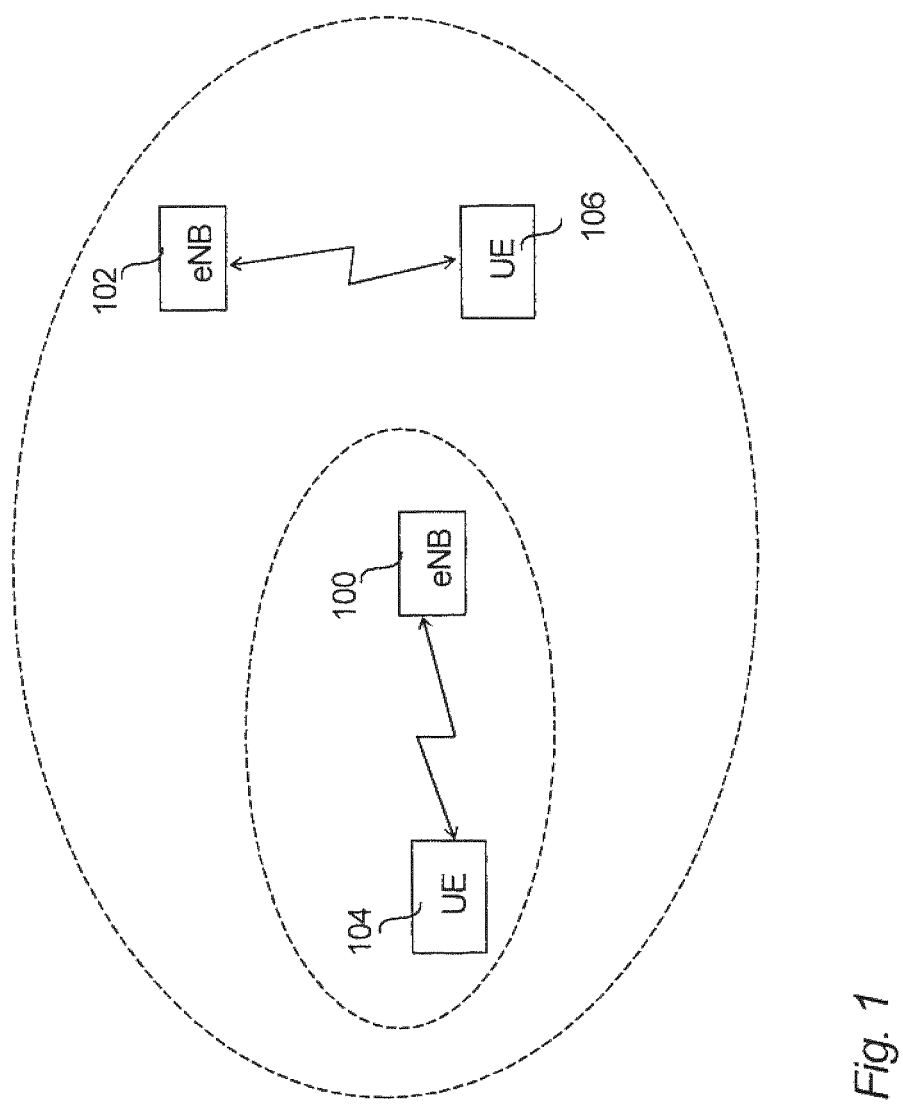
FIG. 1 illustrates a wireless communication system to which embodiments of the invention may be applied.

FIG. 1 illustrates a wireless communication scenario to which embodiments of the invention may be applied. Referring to FIG. 1, a cellular communication system may comprise a radio access network comprising base stations disposed to provide radio coverage in a determined geographical area. The base stations may comprise macro cell base stations (eNB) 102 arranged to provide terminal devices (UE) 106 with the radio coverage over a relatively large area spanning even over several square miles, for example. In densely populated hotspots where improved capacity is required, small area cell base stations (eNB) 100 may be deployed to provide terminal devices (UE) 104 with high data rate services. Such small area cell base stations may be called micro cell base stations, pico cell base stations, or femto cell base stations. The small area cell base stations typically have significantly smaller coverage area than the macro base stations 102. The cellular communication system may operate according to specifications of the $3^{rd}$ generation partnership project (3GPP) long-term evolution (LTE) advanced or its evolution version (such as 5G).

In 3GPP networks, the macro cell makes the user terminals aware of neighbouring cells and also of neighbouring cells belonging to different RATs or residing on different carriers, by means of system broadcast information (SIB). In 5G networks, certain frequency layers may be used for certain services only. 5G services are dynamic by their nature. A dynamic service provides that a single radio network is used by multiple service providers, and each service provider may setup and/or tear down their services at any time of day. The user terminal does not know this a priori. Therefore, an idle UE seeking to obtain a service, contacts the macro cell every time, and then the macro cell redirects UE to an appropriate frequency layer (or directly to a cell hosted for that layer). This is because the neighbour cell or neighbour frequency advertisement in SIB is meant to help UE to recamp/reselect the layer/cell. However, if the layer is service-specific, UE is supposed not to/does not need to camp there, if UE is not interested in that specific service. Layers that do not have user terminals connected to them use power and create interference in vain. A service-based handover involves providing UE with redirection information to a layer that best offers the service (in a connected mode). Service based-load balancing may be applied in RAN (radio access network).

The cell may advertise its services. 4G and 3G idle modes at UE are governed by UE reading broadcast system information of the cell that UE is camping on. The broadcast system information indicates which quality thresholds there are for the different frequency layers, and UE performs frequency reselection (i.e. cell reselection) if the quality thresholds are not met. At the air interface, a CBS (cell broadcast service) system defines SIBs which cause UE to wake up from the idle mode and read a common transport channel. The common transport channel enables transmission of various types of CBS messages, ranging from news items to weather forecasts or stock information, etc. SIBs (e.g. SIB15) may indicate the availability of MBMS (multimedia broadcast multicast services) channels.

A list (SystemInformationBlockType15 field descriptions: mbms-SAI-InterFreqList) is provided of neighboring frequencies including additional bands, if any, that provide MBMS services and the corresponding MBMS SAIs. A MBMS SIB advertisement does not indicate whether the broadcast is mobile TV or radio or some other type of broadcast. The MBMS SIB advertisement indicates what the MBMS channel configuration is, but the MBMS SIB advertisement does not foresee that the service is provided in another RAT, as MBMS is part of SFN (single frequency network). If UE is capable of MBMS service continuity and receiving or interested in receiving an MBMS service and is only able to receive a particular MBMS service while camping on a frequency on which the particular MBMS service is provided, UE may consider that frequency to be the highest priority frequency during a MBMS session as long as a reselected cell is broadcasting SIB13 and as long as: SIB15 of the serving cell indicates for that frequency one or more MBMS SAIs included in the MBMS user service description (USD) of the service; or SIB15 is not broadcast in the serving cell and that frequency is included in USD of the service.

Once UE has decided to access a particular MBMS SFN, UE reads the SFN-specific MCCH which informs UE about which MBMS services are available for that SFN. The following applies for an MCCH structure. One MBSFN area is associated with one MCCH, and one MCCH corresponds to one MBSFN area. MCCH is sent on MCH. MCCH contains a single MBSFN area configuration RRC message which lists the MBMS services that have an ongoing session, and an optional MBMS counting request message. Thus, MCCH enables advertising of services for a particular SFN, but MCCH does not enable advertising of services on a different frequency or for a different RAT.

LTE DC defines a system where two neighbouring cells, a master eNB (macro cell eNB, MeNB) and a slave eNB (small sell eNB, SeNB), are configured to serve one UE. MeNB configures UE to perform measurements for potential SeNBs. In LTE DC, UE is provided with dedicated measurements by MeNB in unicast signalling in order to perform load sharing. MeNB stays in control of the connection with UE, even after UE has established a radio link to SeNB. Service related measurements for minimizing drive tests may involve service specific measurements. The service specific measurements refer to service characteristics, and may include measuring KPIs such as latency or packet loss, as a function of the service. The service specific measurements may be bundled with active test traffic.

Figure 2:
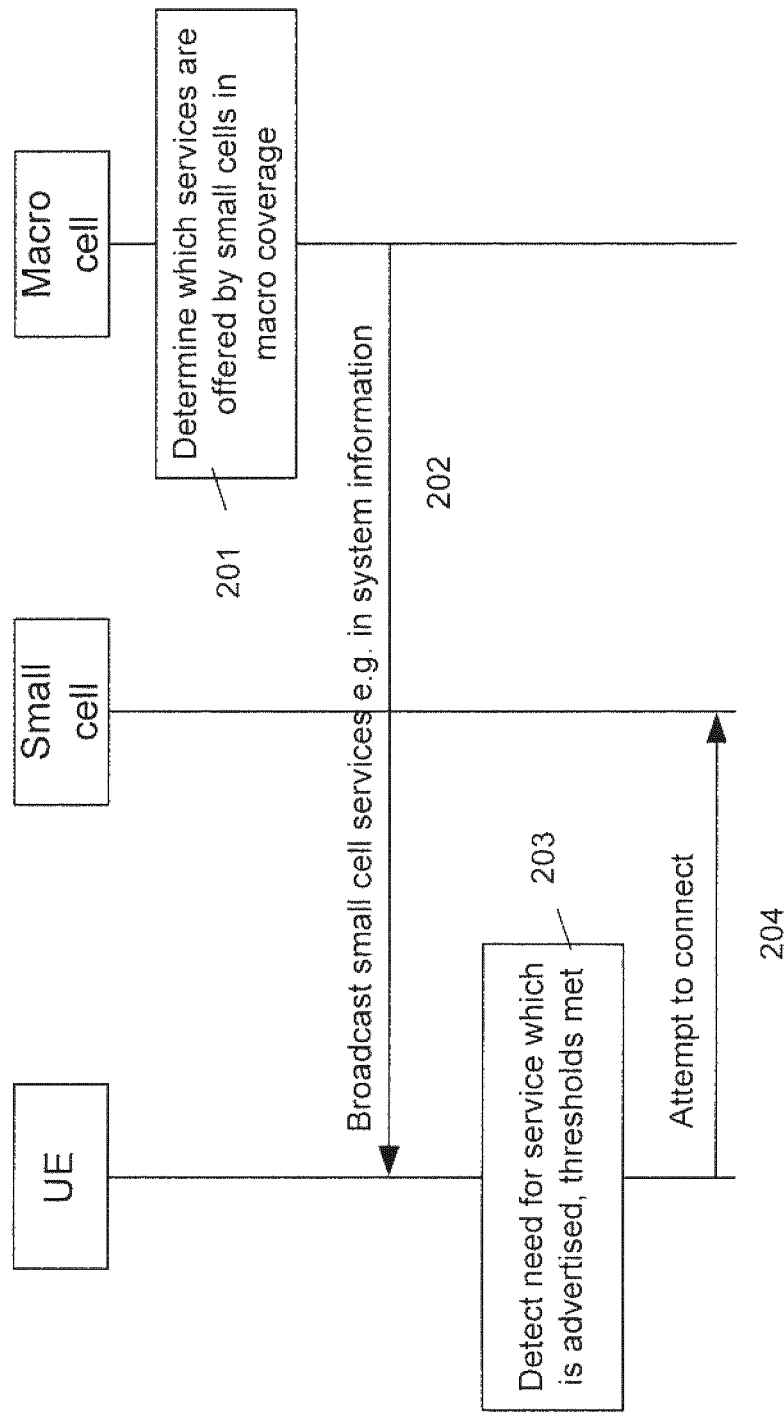
FIGS. 2 to 4 are signalling diagrams of a procedure for cell reselection according to an embodiment of the invention.

Let us now describe an embodiment of the invention for cell reselection with reference to FIG. 2. FIG. 2 illustrates a signalling diagram illustrating a method for communicating cell small cell service parameters between network elements of the cellular communication system. The network element may be a network node, an access node, a base station, a terminal device, a server computer or a host computer. For example, the server computer or the host computer may generate a virtual network through which the host computer communicates with the terminal device. In general, virtual networking may involve a process of combining hardware and software network resources and network functionality into a single, software-based administrative entity, a virtual network. In another embodiment, the network node may be a terminal device. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. Virtual networking may also be used for testing the terminal device.

Referring to FIG. 2, in item 201, a first network node of a first frequency layer, acquires information on services that are offered by a second network node at a second frequency layer, wherein said second network node is within the coverage area of the first network node. In item 202, the first network node broadcasts a service advertisement to at least one terminal device for advertising the services offered by said second network node at the second frequency layer. In item 203, a terminal device receives, from the first network node, the service advertisement. Based on the service advertisement, in item 204, the terminal device may transmit, to said second network node, a request for connecting to at least one of the services offered by said second network node at the second frequency layer.

Figure 3:
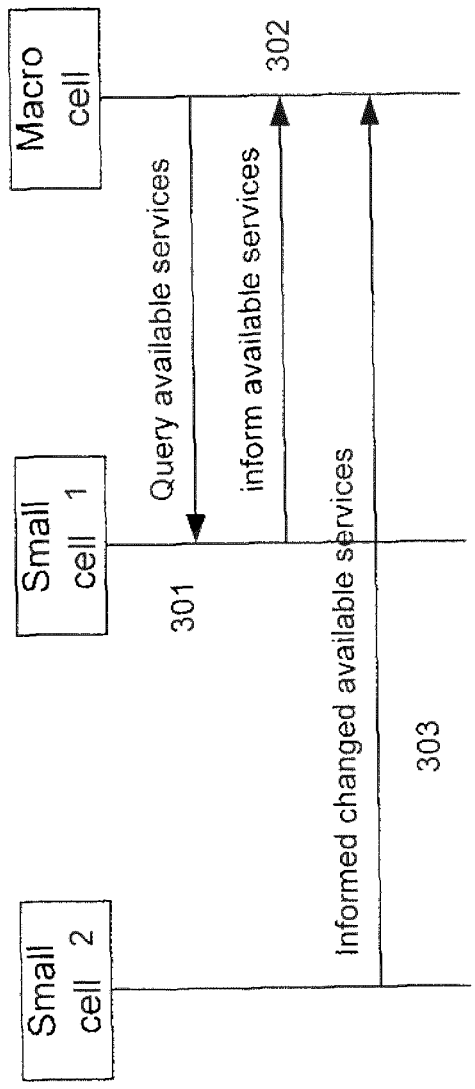
Figure 4:
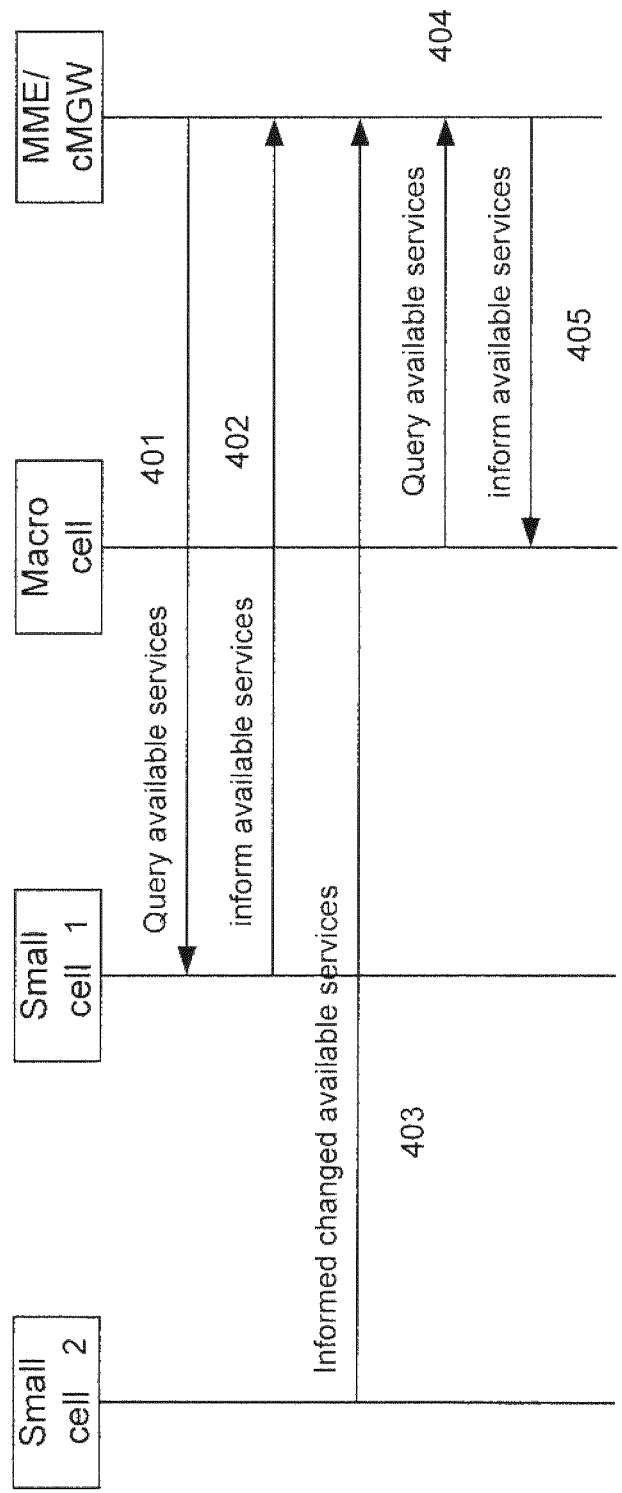

Let us now describe some embodiments of block 201 with reference to FIGS. 3 and 4. FIGS. 3 and 4 illustrate embodiments for determining which services are available in a macro cell coverage area.

Referring to FIG. 3, in item 301, a macro cell network node MeNB may transmit a query message to a small cell network node SeNB1 of a first small cell SC1. In item 302, MeNB may receive a message from SeNB1, the message comprising information on services available in SC1. In item 303, MeNB may receive a message from a small cell network node SeNB2 of a second small cell SC2, the message comprising information on changed services available in SC2.

Referring to FIG. 4, in item 401, a mobility management entity MME/cMGW may transmit a query message to SeNB1. In item 402, MME/cMGW may receive a message from SeNB1, the message comprising information on services available in SC1. In item 403, MME/cMGW may receive a message from a small cell network node SeNB2, the message comprising information on changed services available in SC2. In item 404, MeNB may transmit a query message to MME/cMGW. In item 405, MeNB may receive a message from MME/cMGW, the message comprising information on services available in SC1 and SC2.

In case of macro cells and small cells, the macro cell advertises, to idle UEs, services that are offered by small 5G cells that are within the coverage area of the macro cell (the small cells may or may not advertise their services). The macro cell advertises the small cell services (via layer information) in the system information broadcast (SIB). Relevant SIB elements link a service ID (SID) to one or more frequency layers which belong to the small cells in the coverage area of the macro cell. The relevant SIB element may also establish SID-specific thresholds which override or replace the thresholds otherwise present for the frequency layer. Several SIDs may be linked to one frequency layer. Thus, cell reselection thresholds are service-specific, and several thresholds may be defined for one frequency. This enables service-specific cell reselection, and redirection is avoided. Further, when releasing UE to the idle mode, the network may configure UE's frequency priorities by linking frequency layers and their thresholds and services.

In case of service layers, a first frequency layer advertises services not offered by the first network layer, but offered by other frequency layers. The advertisement may indicate a radio access technology (RAT) different from that of the first network layer. The advertisement may contain service-specific thresholds. The advertised network layers are within the coverage area of the first network layer, wherein the first network layer is a macro cell, and the advertised network layers are small cells.

Figure 5:
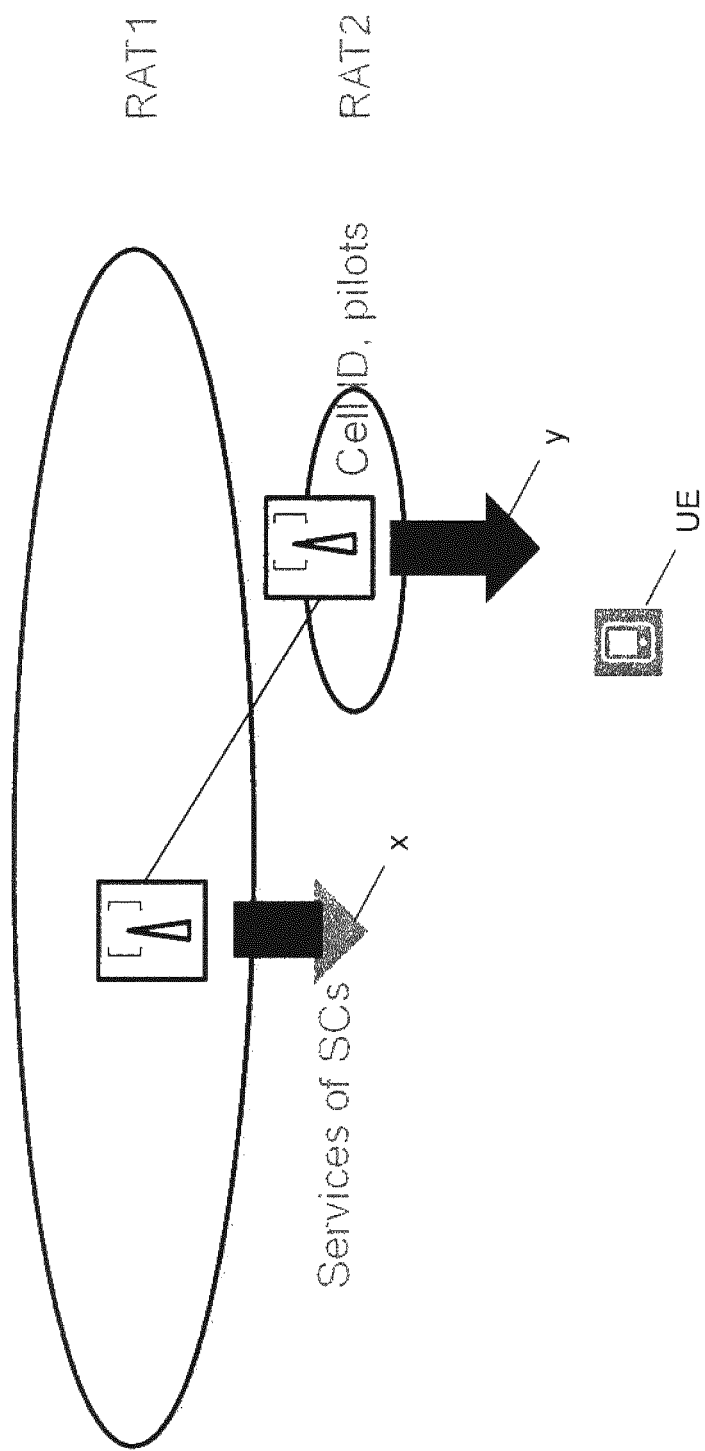
FIG. 5 illustrates a small cell—macro cell scenario according to an embodiment of the invention.

The advertising of the services provided by another cell may be carried out as shown in FIG. 5. For example, RAT1 may be LTE (4G), and RAT2 may be 5G. The 4G macro cell eNB sends a broadcast signal which advertises that in the coverage area of the 4G macro cell eNB, any UE may find 5G cells offering specific services. The advertisement does not imply whether any UE is within the coverage area of the 5G cell or not. However, the advertisement allows UEs that are wishing to obtain a given service, to start scanning for 5G cells. There may be several service advertisements broadcast by the macro cell, wherein each service advertisement is specific to a different frequency layer, and/or each service advertisement is specific to its own cell selection criteria (measurement trigger configuration). The broadcast advertisement is geared towards idle UEs. In FIG. 5, the small cell within the macro cell, on the different frequency or different RAT, is able to offer services. The macro cell advertises the small cell services (arrow "x" indicating system broadcast), such that UEs that are interested may start scanning for the small cell (arrow "y" indicating pilots). UE within the coverage area of the macro cell receives the broadcast of the macro cell every time. UE may detect the presence of the small cells e.g. by pilot measurements, and seek to connect when the measurement thresholds have been reached. The measurements that UE may carry out to find new cells are configured by the network. The measurements may include UE measuring, for example, the pilot power (i.e. received signal power of a known physical signal or channel) or signal-to-interference ratio (SIR).

The network carries out the configuration of the measurement configurations and also performs the actual cell selection in a proprietary fashion. A NAS layer knows which are the capabilities of the small cells within the coverage area of the macro cell, and the NAS layer knows which are the service requirements that need to be fulfilled to obtain the service. The service requirements are translated into radio quality parameters. For example, if minimal throughput (TP) rates are obtainable with the radio link quality, UE may attempt to connect to the small cell. If the small cell is too loaded, the service may not be advertised.

Figure 6:
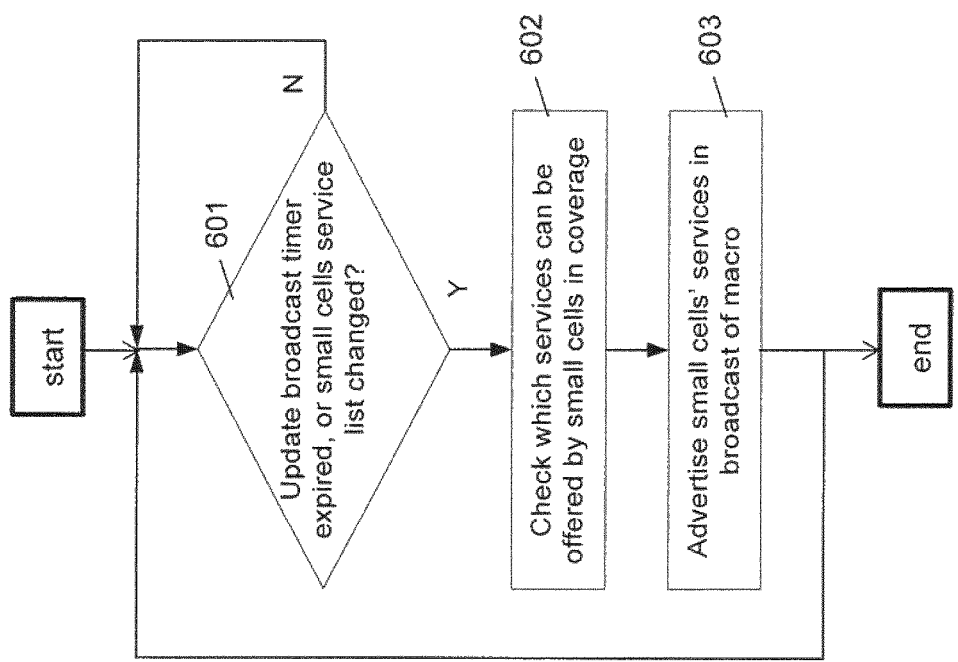
FIGS. 6 to 8 illustrate processes for cell reselection according to an embodiment of the invention.
Figure 7:
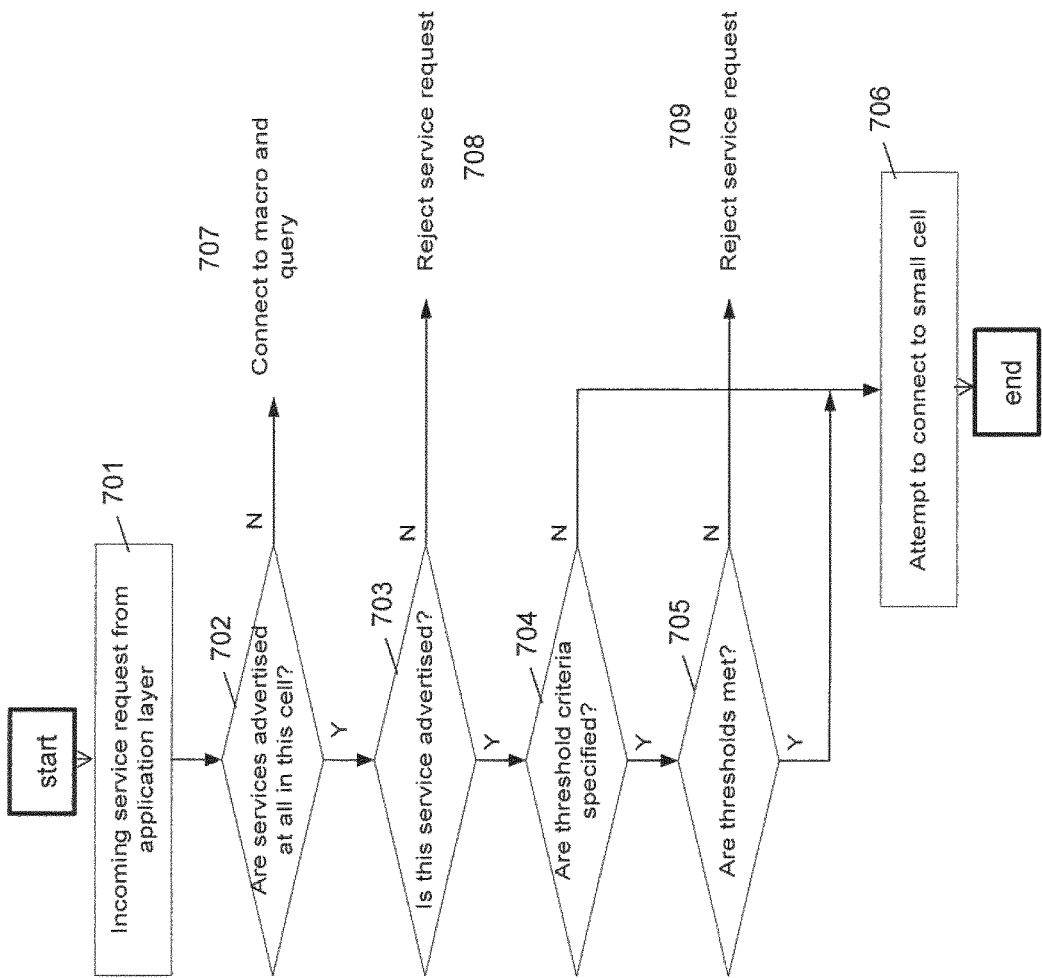
Figure 8:
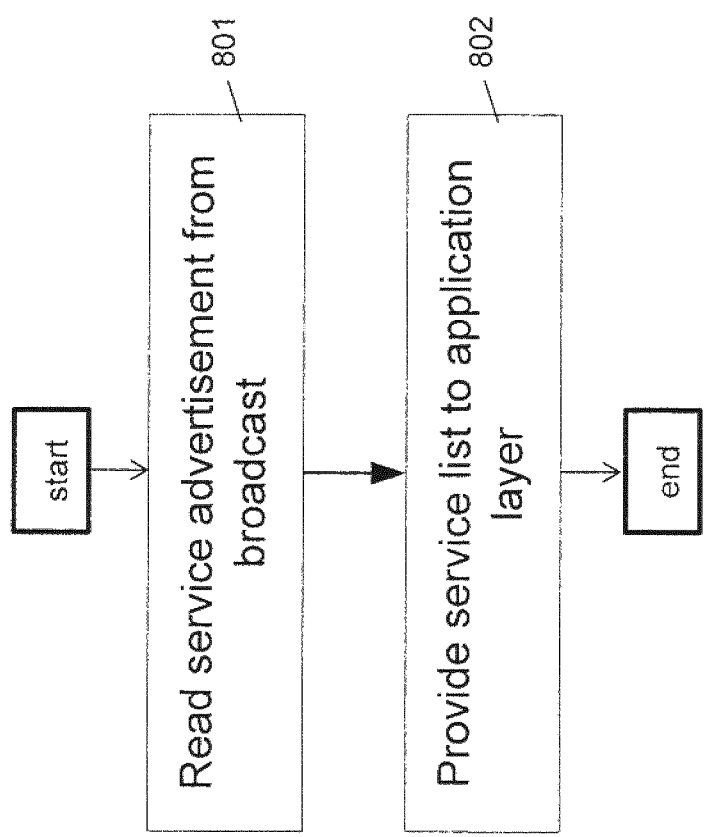

Let us now describe embodiments of the cell reselection in greater detail with reference to FIGS. 6 to 8. FIG. 6 illustrates the setting of the broadcast from a network perspective, FIG. 7 illustrates actions before attempting to connect to a small cell layer holding a specific service, from a UE perspective, and FIG. 8 illustrates UE actions when reading system information in the macro cell, wherein UE may also have informed an application layer earlier about services available in the macro cell.

Referring to FIG. 6, in response to an expiry of a broadcast timer or SC service being changed in item 601, an apparatus such as MeNB checks 602 which services are offered by SCs in the coverage area of MeNB. In item 603, MeNB advertises the offered SC services by broadcasting.

Referring to FIG. 7, in item 701, UE receives a service request from an application layer. In item 702, UE checks whether services are advertised in the macro cell. If not, UE connects to the macro cell and queries 707 the services from the macro cell. If yes, UE checks 703 whether the service in question is advertised. If no, UE rejects 708 the service request. If yes, UE checks 704 whether there are threshold criteria specified. If not, UE attempts 706 to connect to the small cell. If yes, UE checks 705 whether threshold criteria is met. If not, UE rejects 709 the service request. If yes, UE attempts 706 to connect to the small cell.

Referring to FIG. 8, in item 801, the terminal device receives and reads the broadcast service advertisement. In item 802, based on the advertisement, the terminal device provides a list of services to an application layer.

The macro cell service advertisement broadcast for advertising the small cells' services may be included in a SIB element {SC: SID1, SID2} indicating that there are service IDs (SIDs) 1,2 available on the small cells (SC) in this macro cell. The macro cell may additionally broadcast specific parameters which help UE to resolve SC(s) for these service IDs rather quickly (e.g. by providing a specific synchronization mask for an initial cell search). The advertisement may also indicate the frequency layer or a RAT type. For example, service SID2 may be available on mmWave (RAT2) on carriers F2 and F3, while service SID1 may be available on cmWave on carrier F1: {SID1: F1, RAT1; SID2: F2, F3, RAT2}. In another example, service SID1 may be advertised on carriers F1 and F2, for RAT1 and RAT2: {SID1: F1, RAT1, F2, RAT2}. The advertisement may also indicate thresholds (e.g. th1, th2) that are to be met in order to access the service: {SID1: th1; SID2: th2}. The thresholds are already defined for the frequency layers leading to, for instance, recamping of UE. Herein the thresholds are service-specific and lead to avoiding contacting the macro cell (the thresholds are not intended for cell recamping, but are to be evaluated when the service is started).

UE may skip reading the broadcast channel when the layer information has changed, for those services that UE is not interested in. The requests by UE to connect to a service may also be enhanced, for example, by mobility information. The macro cell may consider providing the measurement configurations based on UE's subscriber profile.

The macro cell may be a 2G, 3G, LTE or 5G macro cell. The small cell may be a 5G small cell.

Idle UEs that wish to obtain a service available only from the small cell or from a different frequency layer need not contact the macro cell. This enables avoiding the redirection of traffic to the macro cell. Further, idle UEs wishing to access one specific service but not another, are only required to scan a specific frequency. UEs wishing to access a specific service only need to attempt to connect to the service when the service is available.

Services present in other cells are advertised, and no redirection or load balancing is performed in direct form.

An exemplary embodiment applies to idle UEs.

Service-specific quality thresholds for the different frequency layers and frequencies are relayed.

The cell (an umbrella cell such as the macro cell) may advertise services offered by another cell (contained within the umbrella cell) which may even be provided by another RAT, wherein the cell advertises services offered by another cell by abstracting those cells as a layer that provides the service.

Services of a different cell may be advertised such that the advertisement is service-specific and may indicate the RAT type. The service advertisement may contain service-specific access thresholds, and several services may be advertised for one layer. UE may camp on a macro cell that is not providing the service. UE is able to access the service-providing layer as soon as UE has the need for the service.

A service specific advertisement and measurement configuration is broadcast to the idle UEs, and the idle UEs connect directly to the cell which they are not camping on (camping is defined only for the idle UEs). The cell on which UE camped until then is not burdened by the UE signaling. It is possible to provide UE with services not available in MeNB.

The service advertisements enable UE to connect to the service-specific layer. Using the service-specific thresholds involves using existing radio parameters, albeit with different thresholds.

An exemplary embodiment enhances 5G networks small cells discovery, small cells broadcast avoidance, and UE and small cells energy savings.

Neighbouring cell information with service indication is provided in the broadcast information for cells dedicated to the specific service, by introducing a service concept to a layer concept: the layer is not only characterized by the frequency, RAT, and thresholds, but also by the service type, service configuration, protocol configuration and service thresholds.

UE camping on two layers at once may be carried out, if the service layer uses its own paging.

Some frequency layers may be dedicated e.g. to only one service, such as V2V. Service groups may be defined, thereby obtaining a compromise between UE traffic querying cells for services and the amount of broadcast information.

The advertisement may comprise an exception list, such as: {any SID but SID1: F1, RAT1}.

The service advertisement may be part of the system information (SI) broadcast. In 3G, only idle UEs may read the broadcast. In LTE, idle as well as connected UEs may read the broadcast. In 5G, the UE behaviour for reading the broadcast is still to be defined. Future UEs may also be capable of maintaining two parallel connections to two different RATS, such as 4G and 5G. Those UEs may be considered idle in both RATs, or idle in one RAT and connected in the other RAT. In either case, in an embodiment, UE may listen to the broadcast of one frequency layer only, and the network is not faced with redirection traffic.

Herein, a service may refer to categories of applications. The service may be associated with QoS attributes. The services may be associated with protocol variants or protocol parameterizations or protocol profiles (several profiles may exist for a service). The service categories may be predefined in the network, and then advertised as an index in a cell-specific service offering notification. The services may include services supported by 5G networks, such as V2V services which have low latency and high reliability requirements, M2M or sensor network services which have low terminal density and low power requirements, specialized video-on-demand services or real-time video relay services in uplink, ethernet services for localized low-latency high-throughput data applications, and basic standard services of high data rate or GBR services like VoIP, CS voice.

Herein, a service advertisement refers to a notification message on the availability of the service. The service advertisement may also include a service configuration (QoS, protocol variant, subscription cost). Signalling of the service advertisement (beyond SIB broadcast) for idle UEs may also take the form of a dedicated broadcast channel which UEs routinely read. This may be similar (but not identical) to the MBMS advertisement channel, except that non-SFN services are advertised, and that services for a different layer are advertised. The content of the dedicated broadcast channel may be that of SIBs.

Figure 9:
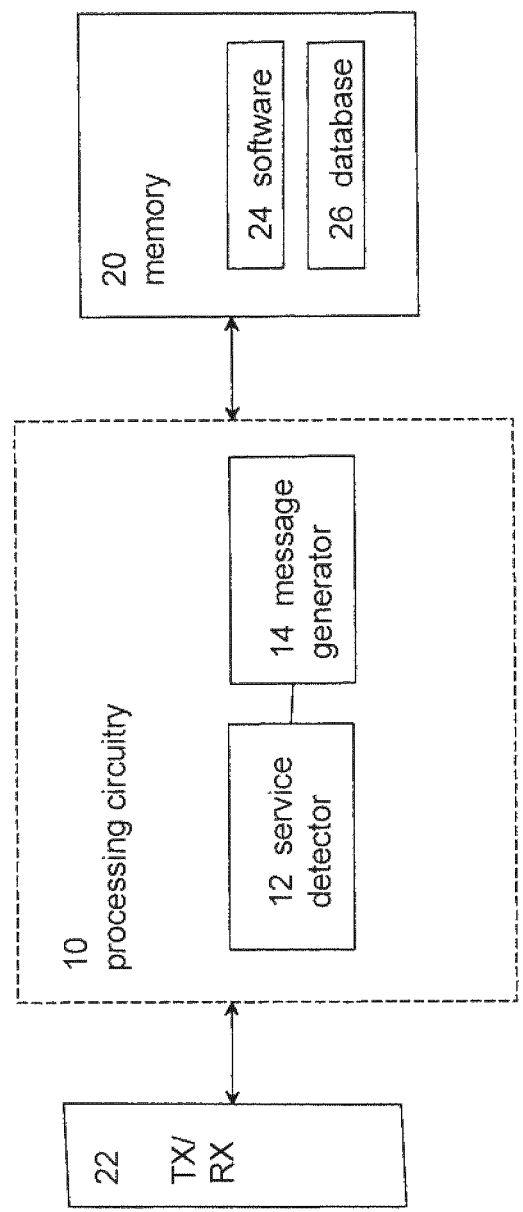
FIGS. 9 and 10 illustrate blocks diagrams of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the procedures of the above-described network element or the network node. The at least one processor, the at least one memory, and the computer program code may thus be considered as an embodiment of means for executing the above-described procedures of the network element or the network node. FIG. 9 illustrates a block diagram of a structure of such an apparatus. The apparatus may be comprised in the network element or in the network node, e.g. the apparatus may form a chipset or a circuitry in the network element or in the network node. In some embodiments, the apparatus is the network element or the network node. The apparatus is configured to operate at a first frequency layer and comprises a processing circuitry 10 comprising the at least one processor. The processing circuitry 10 may comprise a service detector 12 configured to acquire information on services that are offered by another frequency layer network node. Said another frequency layer network node is within the coverage area of the apparatus. The service detector 10 may be configured to acquire the information related to the service(s), as described above, and output the information to a message generator 14. The message generator 14 is configured to broadcast a service advertisement to at least one terminal device for advertising the service(s) offered by said another frequency layer network node.

The processing circuitry 10 may comprise the circuitries 12 and 14 as subcircuitries, or they may be considered as computer program modules executed by the same physical processing circuitry. The memory 20 may store one or more computer program products 24 comprising program instructions that specify the operation of the circuitries 12 and 14. The memory 20 may fur-their store a database 26 comprising definitions for central QoE orchestration, for example. The apparatus may further comprise a communication interface 22 providing the apparatus with radio communication capability with the terminal devices. The communication interface 22 may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the communication interface may be connected to a remote radio head comprising at least an antenna and, in some embodiments, radio frequency signal processing in a remote location with respect to the base station. In such embodiments, the communication interface may carry out only some of radio frequency signal processing or no radio frequency signal processing at all. The connection between the communication interface and the remote radio head may be an analogue connection or a digital connection. In some embodiments, the communication interface may comprise a fixed communication circuitry enabling wired communications.

Figure 10:
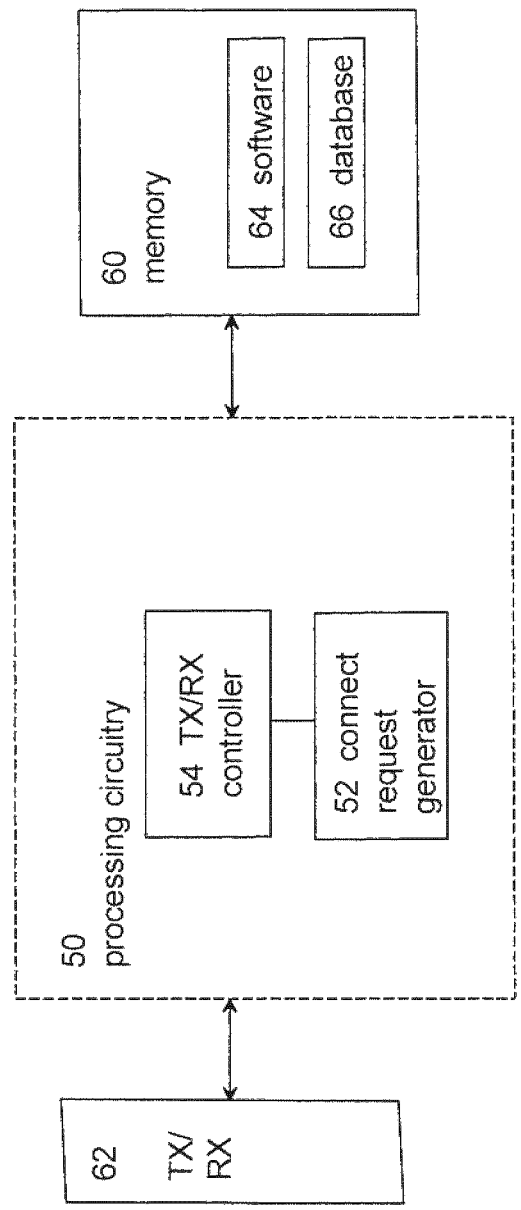

An embodiment provides another apparatus comprising at least one processor and at least one memory including a computer program code, wherein the at least one memory and the computer program code are configured, with the at least one processor, to cause the apparatus to carry out the procedures of the above-described terminal device. The at least one processor, the at least one memory, and the computer program code may thus be considered as an embodiment of means for executing the above-described procedures of the terminal device. FIG. 10 illustrates a block diagram of a structure of such an apparatus. The apparatus may be comprised in the terminal device, e.g. it may form a chipset or a circuitry in the terminal device. In some embodiments, the apparatus is the terminal device. The apparatus comprises a processing circuitry 50 comprising the at least one processor. The processing circuitry 50 may comprise a communication controller 54 configured to extract service advertisement messages received from a first frequency layer network node (such as a macro cell base station) and containing advertising information on services offered by another frequency layer network node. The apparatus may further comprise a connect request generator 52 configured to transmit, to said another frequency layer network node, a request to connect to at least one service offered by said another frequency layer network node.

The processing circuitry 50 may comprise the circuitries 52, 54 as subcircuitries, or they may be considered as computer program modules executed by the same physical processing circuitry. The memory 60 may store one or more computer program products 64 comprising program instructions that specify the operation of the circuitries 52, 54. The apparatus may further comprise a communication interface 62 providing the apparatus with radio communication capability with base stations of one or more cellular communication networks. The communication interface 62 may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the communication interface 62 may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 10 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

AP access point
CBS cell broadcast service
ID identifier
LTE DC LTE dual connectivity
M2M machine to machine
MBMS multimedia broadcast multicast service
MeNB master eNB
MME mobility management entity
cMGW control MME gateway
NAS non-access stratum
RACH random access channel
RAN radio access network
RAT radio access technology
RRC radio resource control
SAI service area identifier
SC small cell
SeNB slave eNB
SFN single frequency network
SI system information
SIB system information block
SID service ID
TP throughput
TV television
UE user equipment
USD user service description
V2V vehicle to vehicle
VoIP voice over IP
CS circuit switched
GBR guaranteed bit rate
5G $5^{th}$ generation
MCCH main control channel
MCH multicast channel
MBSFN multimedia broadcast single frequency network

The invention claimed is:

1. A method comprising:
   acquiring, in a first network node of a first frequency layer, information on services that are offered by a second network node at a second frequency layer,
   wherein said second network node is within a coverage area of the first network node, wherein the coverage area of the first network node corresponds to a macro cell and a coverage area of the second network node corresponds to a small cell; and
   broadcasting, from the first network node, a service advertisement message to at least one terminal device for advertising the services offered by said second network node at the second frequency layer, whereby the first network node advertises small cell services in a system information broadcast element which is provided with one or more service identifier-specific thresholds for a frequency layer, wherein the system information broadcast element links a service identifier to one or more frequency layers of the small cell in the coverage area of the macro cell.

2. The method of claim 1 further comprising in the first network node:

obtaining capability information on small cells within the coverage area of the macro cell;
obtaining information on service requirements that are to be fulfilled to receive the service;
translating the service requirements into radio link quality parameters;
based on the translating, advertising the service if a required throughput rate is obtainable with the radio link quality parameters.

3. A method comprising:
receiving, from a first network node of a first frequency layer, a service advertisement message advertising services offered by a second network node at a second frequency layer, with a small cell system information broadcast element which is provided with one or more service identifier-specific thresholds for a frequency layer, wherein a system information broadcast element links a service identifier to one or more frequency layers of the small cell in a coverage area of a macro cell, wherein said second network node is within the coverage area of a first network node, wherein the coverage area of the first network node corresponds to the macro cell and the coverage area of the second network node corresponds to the small cell; and
based on the service advertisement message, transmitting, to said second network node, a request to connect to at least one service offered by said second network node at the second frequency layer.

4. The method of claim 3, wherein
the service advertisement message indicates a radio access technology different from that of the first network node.

5. The method of claim 3, wherein
the service advertisement message comprises information on one or more service-specific thresholds.

6. The method of claim 3, wherein
the first network node is a macro cell network node, and said second network node is a small cell network node.

7. The method of claim 3, wherein
the service advertisement message is broadcast to terminal devices in a system information broadcast SIB element.

8. The method of claim 3, wherein
the service advertisement message is frequency layer-specific; or
the service advertisement message is cell selection criteria-specific.

9. The method of claim 3, wherein the frequency layer is specific to one or more services.

10. The method of claim 3, wherein
a system information broadcast element comprises an exception list indicating service identifiers of unavailable services.

11. An apparatus comprising:
at least one processor; and
at least one memory including a computer program code, wherein the at least one memory and the computer program code are configured, with the at least one processor, to cause the apparatus to
acquire, in a first network node of a first frequency layer, information on services that are offered by a second network node at a second frequency layer,
wherein said second network node is within a coverage area of the first network node wherein the coverage area of the first network node corresponds to a macro cell and the coverage area of the second network node corresponds a small cell; and
broadcast, from the first network node, a service advertisement message to at least one terminal device for advertising the services offered by said second network node at the second frequency layer, whereby the apparatus is caused to advertises small cell services in a system information broadcast element which is provided with one or more service identifier-specific thresholds for a frequency layer, wherein the system information broadcast element links a service identifier to one or more frequency layers of the small cell in the coverage area of the macro cell.

12. The apparatus of claim 11, wherein the frequency layer is specific to one or more services.

13. The apparatus of claim 11, wherein
the system information broadcast element comprises an exception list indicating service identifiers of unavailable services.

14. An apparatus comprising;
means for acquiring, in a first network node of a first frequency layer, information on services that are offered by a second network node at a second frequency layer,
wherein said second network node is within a coverage area of the first network node, wherein the coverage area of the first network node corresponds to a macro cell and a coverage area of the second network node corresponds to a small cell; and
further comprising a means for broadcasting, from the first network node, a service advertisement message to at least one terminal device for advertising the services offered by said second network node at the second frequency layer, whereby the first network node advertises small cell services in a system information broadcast element which is provided with one or more service identifier-specific thresholds for a frequency layer, wherein the system information broadcast element links a service identifier to one or more frequency layers of the small cell in the coverage area of the macro cell.

15. An apparatus configured to operate at a first frequency layer in a macro cell, wherein the apparatus comprises:
a service detector configured to acquire information on services that are offered by another frequency layer in a small cell, wherein said another frequency layer is within a coverage area of the first frequency layer; and
a message generator configured to broadcast a service advertisement to at least one terminal device for advertising the services offered by said another frequency layer, whereby the apparatus is caused to advertises small cell services in a system information broadcast element which is provided with one or more service identifier-specific thresholds for a frequency layer, wherein a system information broadcast element links a service identifier to one or more frequency layers of the small cell in the coverage area of the macro cell.

16. An apparatus comprising:
at least one processor; and
at least one memory including a computer program code, wherein the at least one memory and the computer program code are configured, with the at least one processor, to cause the apparatus to:
receive, from a first network node of a first frequency layer, a service advertisement message advertising services offered by a second network node at a second frequency layer with a small cell system information broadcast element which is provided with one or more service identifier-specific thresholds for a frequency layer, wherein a coverage area of the first network node corresponds to a macro cell and a coverage area of the second network node corresponds to a small cell, wherein the system information broadcast element links a service identifier to one or more frequency layers of the small cell in a coverage area of the macro cell, wherein said second network node is within the coverage area of the first network node; and based on the service advertisement message, transmit, to said second network node, a request to connect to at least one service offered by said second network node at the second frequency layer.

17. The apparatus as claimed in claim 16, wherein the at least one memory and the computer program code are configured, with the at least one processor, to cause the apparatus to perform frequency scanning for small cells; and
connect to a small cell of the small cells for which measurement thresholds are reached.

18. The apparatus as claimed in claim 16, wherein the request to connect to the at least one service comprises mobility information.

19. A computer program product embodied on a non-transitory distribution medium readable by a computer and comprising program instructions which, when loaded into an apparatus, execute the method according to claim 1.

20. A computer program product embodied on a non-transitory distribution medium readable by a computer and comprising program instructions which, when loaded into the computer, execute a computer process comprising causing a network node to:

operate at a first frequency layer in a macro cell;
acquire information on services that are offered by another frequency layer in a small cell, wherein said another frequency layer is within a coverage area of the first frequency layer; and
broadcast a service advertisement message to at least one terminal device for advertising the services offered by said another frequency layer, whereby the network node is caused to advertise small cell services in a system information broadcast element which is provided with one or more service identifier-specific thresholds for a frequency layer, wherein the system information broadcast element links a service identifier to one or more frequency layers of the small cell in the coverage area of the macro cell.

* * * * *